United States Patent
Patel et al.

(10) Patent No.: US 11,444,795 B1
(45) Date of Patent: Sep. 13, 2022

(54) INTELLIGENT MEETING ASSISTANT

(71) Applicants: AT&T Intellectual Property I, L.P., Atlanta, GA (US); AT&T Mobility II LLC, Atlanta, GA (US)

(72) Inventors: Bhumit Patel, Smyrna, GA (US); Wasib Khallil, Lilburn, GA (US); Jonathan Chang, Atlanta, GA (US); Iftekhar Alam, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/184,747

(22) Filed: Feb. 25, 2021

(51) Int. Cl.
*H04L 12/18* (2006.01)
*G06F 3/16* (2006.01)
*G10L 15/26* (2006.01)

(52) U.S. Cl.
CPC .......... *H04L 12/1818* (2013.01); *G06F 3/165* (2013.01); *G10L 15/26* (2013.01); *H04L 12/1831* (2013.01)

(58) Field of Classification Search
CPC .. H04L 12/1818; H04L 12/1831; G10L 15/26
See application file for complete search history.

(56) References Cited

U.S. PATENT DOCUMENTS

| | | | |
|---|---|---|---|
| 6,807,563 B1 | 10/2004 | Christofferson et al. | |
| 7,333,798 B2 | 2/2008 | Hodge | |
| 7,672,845 B2 | 3/2010 | Beranek et al. | |
| 7,769,705 B1 | 8/2010 | Luechtefeld | |
| 8,233,606 B2 | 7/2012 | Brunson | |
| 8,250,141 B2 | 8/2012 | Xiao et al. | |
| 8,345,849 B2 | 1/2013 | Lee et al. | |

(Continued)

FOREIGN PATENT DOCUMENTS

| GB | 2569650 B | 11/2020 |
|---|---|---|
| WO | 2020233068 A1 | 11/2020 |

OTHER PUBLICATIONS

Oeppen, R.S. et al., Human factors recognition at virtual meetings and videoconferencing: how to get the best performance from yourself and others; British Journal of Oral and Maxillofacial Surgery 58, May 11, 2020; 643-646.

(Continued)

*Primary Examiner* — Nam T Tran
(74) *Attorney, Agent, or Firm* — Guntin & Gust, PLC; Kenneth Silkit Kwan

(57) ABSTRACT

Aspects of the subject disclosure may include, for example, receiving a first user input that identifies a first trigger phrase to be monitored for in a first virtual meeting being facilitated by the device, monitoring, responsive to the receiving the first user input, the first virtual meeting for occurrences of the first trigger phrase, determining that a user of the device is currently engaged in a second virtual meeting being facilitated by the device, detecting, based on the monitoring, an occurrence of the first trigger phrase in the first virtual meeting, and causing a first notification regarding the occurrence of the first trigger phrase in the first virtual meeting to be outputted, wherein the causing is based on the determining that the user of the device is currently engaged in the second virtual meeting. Other embodiments are disclosed.

20 Claims, 8 Drawing Sheets

(56) References Cited

U.S. PATENT DOCUMENTS

| | | | |
|---|---|---|---|
| 8,537,980 | B2 | 9/2013 | Stallings et al. |
| 8,660,849 | B2 | 2/2014 | Gruber et al. |
| 8,718,253 | B2 | 5/2014 | Sharland et al. |
| 9,432,517 | B2 | 8/2016 | Youel et al. |
| 9,549,074 | B2 | 1/2017 | Blewett et al. |
| 9,652,113 | B1* | 5/2017 | Colson ................ H04L 12/1822 |
| 9,781,385 | B2* | 10/2017 | Ma ........................... H04N 7/15 |
| 10,142,482 | B2 | 11/2018 | Blewett et al. |
| 10,554,697 | B1 | 2/2020 | Ledet |
| 10,572,961 | B2 | 2/2020 | Hodge |
| 10,645,035 | B2* | 5/2020 | Nowak-Przygodzki ..................... H04L 12/1831 |
| 10,860,786 | B2 | 12/2020 | Hodge |
| 2008/0107244 | A1 | 5/2008 | Setzer et al. |
| 2011/0271212 | A1* | 11/2011 | Jones ................. H04L 12/1822 715/753 |
| 2012/0269185 | A1 | 10/2012 | Castleman et al. |
| 2015/0324899 | A1 | 11/2015 | Starikova et al. |
| 2016/0050175 | A1 | 2/2016 | Chaudhry et al. |
| 2016/0294964 | A1* | 10/2016 | Brune .................... H04L 67/26 |
| 2018/0063480 | A1 | 3/2018 | Luks et al. |
| 2019/0042187 | A1 | 2/2019 | Truong et al. |
| 2019/0327362 | A1* | 10/2019 | Herrin ................ H04L 12/1822 |
| 2020/0092519 | A1 | 3/2020 | Shin et al. |
| 2021/0258427 | A1* | 8/2021 | Lee .................... H04L 12/1827 |

OTHER PUBLICATIONS

Rajan, Rahul et al., "Roger that!"—The Value of Adding Social Feedback in Audio-Mediated Communications; Interact 2013, Part IV, LNCS 8120, pp. 471-488, 2013.

Rajan, Rahul, Considerate Systems; Submitted in partial fulfillment of the requirements for the degree of Doctor of Philosophy in Electrical and Computer Engineering; Carnegie Mellon University; Sep. 2016; pp. 1-156.

* cited by examiner

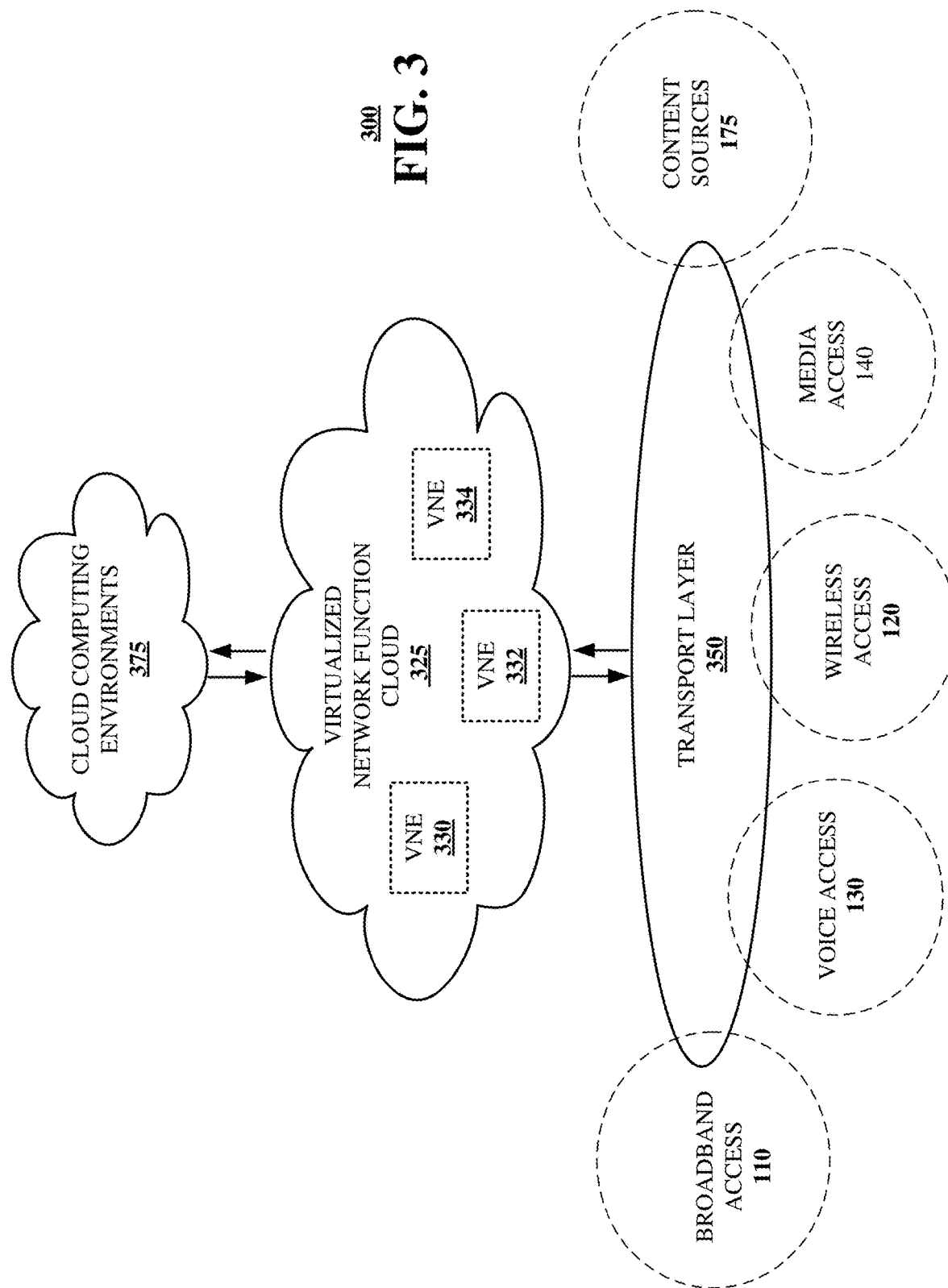

INTELLIGENT MEETING ASSISTANT

FIELD OF THE DISCLOSURE

The subject disclosure relates to an intelligent meeting assistant system.

BACKGROUND

As more enterprises embrace a digital culture and adopt mobile workforces, new tools and technologies are being used to facilitate remote working and virtual collaboration. Video conferencing via meeting applications, in particular, have become the go-to mode of both internal and external communications.

With the ease of scheduling virtual meetings, however, users are often overbooking their calls and participating in multiple meetings at once while also performing other work-related tasks.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
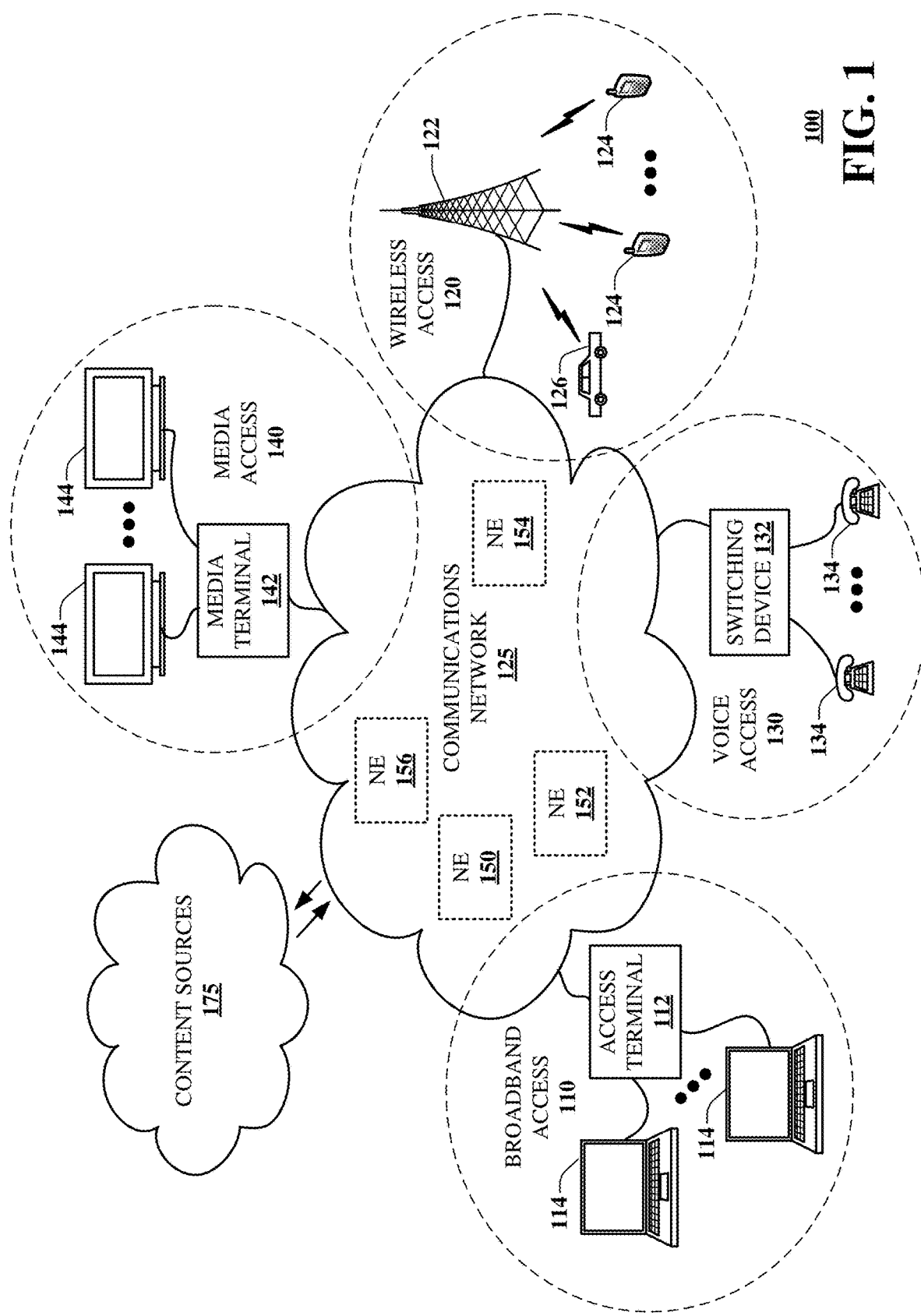
FIG. 1 is a block diagram illustrating an exemplary, non-limiting embodiment of a communications network in accordance with various aspects described herein.

Participating in multiple virtual meetings while simultaneously performing other activities can reduce efficiency and performance. It can also be difficult for a user to know when the user should switch between meetings so as to not miss important discussion points.

The subject disclosure describes, among other things, illustrative embodiments of an intelligent meeting assistant system (e.g., an artificial intelligence (AI)-based meeting assistant) that is capable of receiving user inputs or selections identifying one or more key (or trigger) phrases and/or conditions to monitor for in a virtual meeting (e.g., one or more words being uttered by a meeting participant, a presentation slide being presented, and/or the like), monitoring the virtual meeting for occurrences of the one or more trigger phrases/conditions, and providing user notification(s) based upon detecting an occurrence of the one or more trigger phrases/conditions in the virtual meeting. In various embodiments, the intelligent meeting assistant system may provide an interface that enables a user to input, define, or otherwise select (e.g., via text, via voice command, and/or the like), trigger phrase(s)/condition(s) to monitor for in one or more virtual meetings. In some embodiments, the intelligent meeting assistant system may monitor a virtual meeting by analyzing or processing a data stream (or data packets) associated with the virtual meeting, such as by performing speech-to-text conversion processing, natural language processing, image-based processing, and/or the like on the data stream. The intelligent meeting assistant system may provide notifications of detected trigger phrase(s)/condition(s) in any suitable manner, including, for example, visually (e.g., via a pop-up message and/or by lighting up, blinking, or changing a color of an icon, a window, etc.), audibly (e.g., via an output of an audible tone, speech, etc.), haptically, and/or the like.

In various embodiments, the intelligent meeting assistant system can be implemented as a feature of, or as an enhancement to, a meeting platform that facilitates virtual meetings. In exemplary embodiments, the intelligent meeting assistant system can provide users with the ability to customize the functionality of the intelligent meeting assistant system, and thus the users' meeting experiences. For example, the intelligent meeting assistant system may allow a user to define the manner in which a notification is to be provided (e.g., visually, audibly, and/or the like), enable or disable the intelligent meeting assistant system for some or all virtual meetings, assign priorities to trigger phrases/conditions, and/or configure various other settings, as described herein. In various embodiments, the intelligent meeting assistant system can employ machine learning algorithm(s) to learn a user's behavior or preferences relating to meetings (e.g., the user's behavior in response to notifications provided by the intelligent meeting assistant system) and adjust future actions performed by, or outputs provided by, the intelligent meeting assistant system to enhance the user's meeting experiences, as described herein. In some embodiments, the intelligent meeting assistant system may perform the monitoring and/or provide a notification for a given meeting if (e.g., only if) at least one other meeting is also being simultaneously facilitated, and in certain embodiments, if (e.g., only if) the intelligent meeting assistant system determines that the user is focused on, or engaged in, that other meeting. In alternate embodiments, the intelligent meeting assistant system may perform the monitoring and provide the notification even if only a single meeting is ongoing or being facilitated.

In this way, the intelligent meeting assistant system can notify a user that something of interest has occurred in a particular meeting, which can allow the user to refocus the user's attention to the meeting or otherwise determine whether the user's attention is actually needed. Embodiments of the intelligent meeting assistant system thus relieve a user from having to actively engage, or participate, in a meeting that the user may be required to attend, but that may not necessarily demand the user's attention for the entire duration of the meeting. This promotes work-related efficiency and performance, as the user can choose to actively participate in a particular meeting only when needed (e.g., when certain topic(s) are being discussed, as may be detected by way of trigger phrases or conditions), especially in cases where the user has an overbooked schedule and is participating in multiple meetings at a time. Enabling a user to almost immediately re-engage in a meeting upon detection of an occurrence of a trigger phrase/condition, as described herein, also reduces potential "stale time" in a meeting that might otherwise occur if the user is called upon in the meeting (e.g., to answer a question, to present material, etc.) and does not respond due to the user simply not paying attention or being preoccupied with another task or meeting.

One or more aspects of the subject disclosure include a device, comprising a processing system including a processor, and a memory that stores executable instructions that, when executed by the processing system, facilitate performance of operations. The operations can include receiving a first user input that identifies a first trigger phrase to be monitored for in a first virtual meeting being facilitated by the device, and monitoring, responsive to the receiving the first user input, the first virtual meeting for occurrences of the first trigger phrase. Further, the operations can include determining that a user of the device is currently engaged in a second virtual meeting being facilitated by the device, detecting, based on the monitoring, an occurrence of the first trigger phrase in the first virtual meeting, and responsive to the detecting the occurrence of the first trigger phrase in the first virtual meeting, causing a first notification regarding the occurrence of the first trigger phrase in the first virtual meeting to be outputted, wherein the causing is based on the determining that the user of the device is currently engaged in the second virtual meeting.

One or more aspects of the subject disclosure include a non-transitory machine-readable medium, comprising executable instructions that, when executed by a processing system including a processor, facilitate performance of operations. The operations can include obtaining a user input that identifies a trigger phrase to be monitored for in a first virtual meeting being facilitated, and monitoring, responsive to the obtaining the user input, the first virtual meeting for occurrences of the trigger phrase. Further, the operations can include determining that a user is currently engaged in a second virtual meeting that is being facilitated while the first virtual meeting is being facilitated, detecting, based on the monitoring, an occurrence of the trigger phrase in the first virtual meeting, and responsive to the detecting the occurrence of the trigger phrase in the first virtual meeting, causing a presentation of the first virtual meeting and a presentation of the second virtual meeting to become adjusted to enable the user to transition from engaging in the second virtual meeting to engaging in the first virtual meeting, wherein the causing is based on the determining that the user is currently engaged in a second virtual meeting.

One or more aspects of the subject disclosure include a method. The method can comprise obtaining, by a processing system including a processor, a user input that defines a trigger condition to be monitored for in a first meeting, and monitoring, by the processing system and responsive to the obtaining the user input, the first meeting for occurrences of the trigger condition. Further, the method can include determining, by the processing system, that a user is currently engaged in a second meeting and not engaged in the first meeting, identifying, by the processing system and based on the monitoring, an occurrence of the trigger condition in the first meeting, resulting in an identified occurrence of the trigger condition, and responsive to the identifying the trigger condition in the first meeting, providing, by the processing system, a notification to the user regarding detection of the trigger condition in the first meeting to enable the user to engage in the first meeting, wherein the providing the notification is based on the determining that the user is currently engaged in the second meeting and not engaged in the first meeting.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, receiving of user inputs or selections identifying one or more trigger phrases and/or conditions to monitor for in a virtual meeting, monitoring of the virtual meeting for occurrences of the one or more trigger phrases/conditions, and providing of user notification(s) based upon detecting an occurrence of the one or more trigger phrases/conditions in the virtual meeting. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.
In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
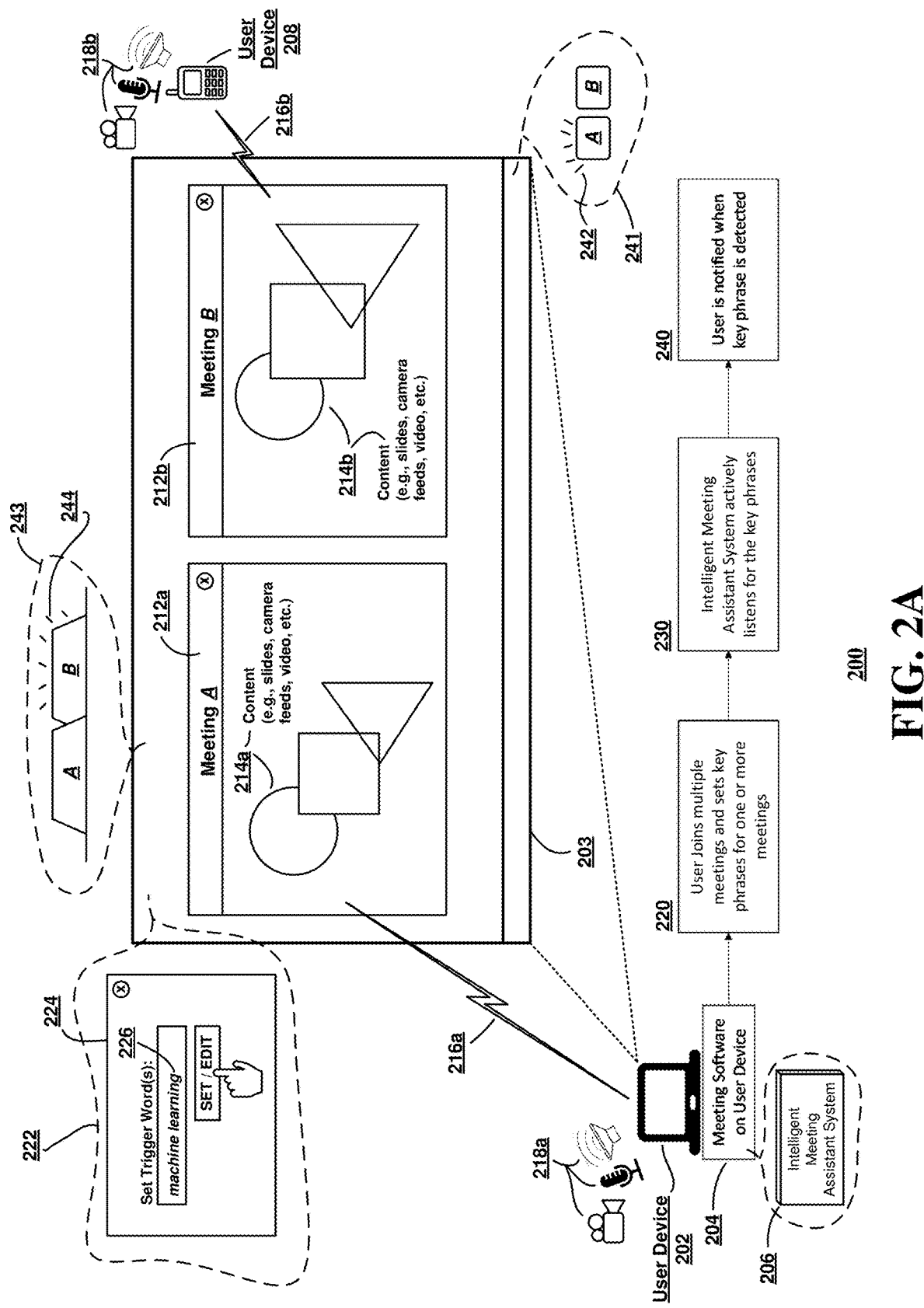
FIG. 2A is a block diagram illustrating an example, non-limiting embodiment of a system functioning in, or in conjunction with, the communications network of FIG. 1 in accordance with various aspects described herein.

FIG. 2A is a block diagram illustrating an example, non-limiting embodiment of a system 200 functioning within, or operatively overlaid upon, the communications network of FIG. 1 in accordance with various aspects described herein.

As shown in FIG. 2A, the system 200 may include a user device 202 that is equipped with a meeting platform 204. The user device 202 may include one or more devices capable of receiving, generating, storing, processing, and/or providing data, including data relating to the meeting platform 204. For example, the user device 202 can include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device.

The meeting platform 204 may include one or more applications that, when executed by a processor of the user device 202, facilitate meetings (e.g., virtual meetings) between a user of the user device 202 and one or more other users over a network, such as the Internet or the like. The meeting platform 204 may enable the user to join and/or participate in a meeting in any suitable manner, such as via a meeting access uniform resource locator (URL) or the like. In various embodiments, the meeting platform 204 may be capable of facilitating multiple meetings simultaneously, thus allowing the user to join and/or participate in different meetings at the same time. In some embodiments, the meeting platform 204 may be configured to communicatively couple to a conference bridge (or provide a conference bridge or cause a remote server device (not shown) to establish a conference bridge) through which participants of a meeting may connect and communicate. Connection to the conference bridge may, for example, enable participants in the meeting to audibly and/or visually interact with one another (e.g., to send and/or receive audio, video, text, etc.). In some embodiments, the meeting platform 204 and/or a remote server device may provide multiple options for connecting to the conference bridge. As an example, the meeting platform 204 and/or the remote server device may enable connection to the conference bridge via Voice over Internet Protocol (VOIP) and/or Video over IP, such that, for example, audio/video exchange is facilitated via input/output components of the user device 202. As another example, the meeting platform 204 and/or the remote server device may enable connection to the conference bridge via a device other than the user device 202. For instance, the meeting platform 204 and/or the remote server can provide a teleconference number or the like for the meeting, which the user can dial into using the other device. As shown in FIG. 2A, for example, a connection 216a may be established for a meeting A such that audio/video exchange is facilitated via input/output components (e.g., reference numeral 218a) of the user device 202, and a different connection 216b may be established for a meeting B such that audio/video exchange is facilitated via input/output components of another user device—e.g., components 218b of a user device 208 (which may, for example, include a mobile phone (e.g., a smart phone, a radiotelephone, etc.) or the like). In this way, the meeting platform 204 may facilitate multiple meetings at a time, where different types of connections to respective conference bridges may be used.

As shown in FIG. 2A, the meeting platform 204 may present, on a display 203 of the user device 202, one or more graphical user interfaces, such as application windows or the like, for a facilitated meeting—e.g., a meeting interface 212a for the meeting A and a meeting interface 212b for the meeting B. A meeting interface may be configured to present content relating to the corresponding meeting. For example, the meeting interface 212a may present content 214a relating to the meeting A, and the meeting interface 212b may present content 214b relating to the meeting B. Content relating to a meeting may, for example, include presentation slide(s), image(s), video(s), live camera feeds (e.g., webcam feeds), and/or the like.

Simultaneously participating in multiple virtual meetings (and, e.g., also performing other activities at the same time) can reduce efficiency and performance. It can also be difficult for a user to know when the user should switch between meetings so as to not miss important discussion points.

As shown in FIG. 2A, the system 200 may include an intelligent meeting assistant system 206 that is capable of receiving user inputs or selections identifying one or more trigger phrases and/or conditions to monitor for in a virtual meeting, monitoring the virtual meeting for occurrences of the one or more trigger phrases/conditions, and providing user notification(s) based upon detecting an occurrence of the one or more trigger phrases/conditions in the virtual meeting. In various embodiments, the intelligent meeting assistant system 206 may be included in the meeting platform 204 (e.g., as one or more modules), and may be configured to communicate with other components and/or systems of the meeting platform 204 to facilitate monitoring of a meeting. In some embodiments, some or all of the components of the intelligent meeting assistant system 206 may be separate from the meeting platform 204, but may be communicatively coupled to the meeting platform 204 or otherwise integrated with the meeting platform 204 (e.g., as an extension or add-on, etc.). In embodiments where the intelligent meeting assistant system 206 is implemented separately from the meeting platform 204, the intelligent meeting assistant system 206 may be capable of accessing or communicatively coupling with the meeting platform 204 (e.g., based on access credentials provided by a user).

As shown by reference number 220, a user may join multiple meetings (e.g., meeting A and meeting B) and input, select, or otherwise define, trigger phrase(s) to be monitored for in one or more of the meetings. A trigger phrase can include alphanumerical characters or symbols. Examples of trigger phrases may include names (e.g., the user's name, another meeting participant's name), terms, subjects or topics, numbers (e.g., a software release number, etc.), and so on.

As shown by reference number 222, the intelligent meeting assistant system 206 may provide an interface—e.g., a trigger interface 224—that enables the user to define trigger phrase(s), such as a trigger phrase 226. The trigger interface 224 may be presented within a corresponding meeting's interface (e.g., meeting interface 212a or 212b) or another interface associated with the meeting platform 204. Although not shown, the trigger interface 224 (and/or another similar interface) may enable the user to define trigger condition(s) to be monitored for in a meeting, such as a particular meeting participant speaking or interacting in the meeting, a live camera feed of a particular meeting participant being presented, a certain meeting presentation slide being presented, a particular image being displayed, a particular video being presented, a certain audio clip being outputted, and/or the like. In some embodiments, the trigger interface 224 (and/or another similar interface) may additionally, or alternatively, enable a user to input a trigger phrase or condition via voice command (e.g., via audio input component(s) of the user device 202, the user device 208, etc.).

The intelligent meeting assistant system 206 may present an instance of the trigger interface 224 at any suitable time and/or based on any condition being satisfied. In various embodiments, the trigger interface 224 may be accessible via user selection from a menu (or preferences) portion of an interface of the meeting platform 204 (e.g., the meeting interface 212a, the meeting interface 212b, or another interface associated with the meeting platform 204), and the intelligent meeting assistant system 206 may present an instance of the trigger interface 224 upon user selection thereof. In some embodiments, the trigger interface 224 may be accessible for a meeting even prior to the user joining the meeting. In certain embodiments, the trigger interface 224 may be accessible at any point during a meeting, which enables the user to leverage the intelligent meeting assistant system 206 for assistance, such as when the user becomes preoccupied with other tasks external to the meeting. In various embodiments, the intelligent meeting assistant system 206 may automatically present the trigger interface 224 before a user joins a meeting (e.g., upon detecting a request to join a meeting, but prior to a meeting connection becoming established), upon a user joining the meeting (e.g., upon the meeting connection becoming established), and/or after a user joins the meeting (e.g., within a threshold time after the meeting platform 204 begins facilitating the meeting). In some embodiments, and in a case where a first meeting (e.g., the meeting A) is ongoing, and a user instructs the meeting platform 204 to join a second meeting (e.g., the meeting B), the intelligent meeting assistant system 206 may, based upon the instruction to join the second meeting, automatically present one or more instances of the trigger interface 224 for trigger phrases or conditions that the user may desire to input or define for the first meeting, the second meeting, or both the first meeting and the second meeting.

As shown by reference number 230, the intelligent meeting assistant system 206 may monitor the meeting for occurrence(s) of the trigger phrase(s)/condition(s). In various embodiments, the intelligent meeting assistant system 206 may monitor data stream(s) flowing through a conference bridge associated with the meeting. In some embodiments, the intelligent meeting assistant system 206 can perform one or more analyses on the data stream(s) to identify, extract, or otherwise detect occurrences of trigger phrase(s) or condition(s). For example, the intelligent meeting assistant system 206 can analyze metadata associated with data packets in the data stream(s) and/or perform various processing on information included in the data stream(s), such as speech-to-text conversion processing, natural language processing, text-based processing, image-based processing (e.g., optical character recognition or image recognition processing on image or video signals), and/or the like to detect any occurrences of trigger phrase(s)/condition(s).

As shown by reference number 240, the intelligent meeting assistant system 206 may provide a notification based upon detection of an occurrence of trigger phrase(s)/condition(s) in a meeting. The intelligent meeting assistant system 206 may provide the notification in any suitable manner. For example, in some embodiments, the intelligent meeting assistant system 206 may provide the notification via a pop-up message or window (e.g., separate from or within an interface associated with the meeting platform 204, such as the meeting interface 212a, the meeting interface 212b, and/or the like). As another example, in some embodiments, the intelligent meeting assistant system 206 may additionally, or alternatively, provide the notification by visually manipulating (e.g., lighting up, blinking, changing a color of, and/or the like) one or more displayed components, such as icons (e.g., as shown by reference numbers 241 and 242), windows, and/or the like. In a case where the meeting platform 204 graphically presents meetings in individual windows, the intelligent meeting assistant system 206 may, for example, cause a portion thereof (e.g., a title bar portion, an outer frame or boundary portion, and/or the like) to blink or light up, change color, and/or the like to alert the user to the detected occurrence of the trigger phrase(s)/condition(s). In a case where the meeting platform 204 graphically presents meetings in different tabs of a single window, the intelligent meeting assistant system 206 may, for example, cause a portion of a tab corresponding to the meeting to blink or light up, change color, and/or the like (e.g., as shown by reference numbers 243 and 244) to alert the user to the detected occurrence of the trigger phrase(s)/condition(s).

In some implementations, the intelligent meeting assistant system 206 may additionally, or alternatively, provide an audible alert to the user. For example, the intelligent meeting assistant system 206 may cause an audio output component (e.g., a speaker or the like) of the user device 202 to output one or more sounds (e.g., tones, spoken words, and/or the like) to alert the user to the detected occurrence of the trigger phrase(s)/condition(s). In some implementations, the intelligent meeting assistant system 206 may additionally, or alternatively, provide a haptic alert to the user, such as by causing a vibration device of, or associated with, the user device 202 to provide a vibration effect to alert the user to the detected occurrence of the trigger phrase(s)/condition(s).

In various embodiments, the intelligent meeting assistant system 206 may additionally, or alternatively, adjust a manner of presentation of some or all of the facilitated meetings when an occurrence of a trigger phrase or condition is detected in one of the meetings. For example, in a case where an occurrence of a trigger phrase or condition is detected in a first meeting, the intelligent meeting assistant system 206 may adjust a manner of display of the first meeting and other meetings (e.g., by increasing a display brightness for the first meeting and/or dimming the display brightness for some or all of the other meetings; by hiding the display of some or all of the other meetings or causing the first meeting to be more prominently displayed than some or all of the other meetings; and/or the like). Continuing the example, the intelligent meeting assistant system 206 may additionally, or alternatively, perform adjustments to audio feeds associated with the first meeting and the other meetings (e.g., by increasing an audio output volume of the audio feed of the first meeting (or enabling or unmuting the audio feed of the first meeting in a case where the audio feed was previously muted) and/or by decreasing audio output volume(s) of the audio feed(s) of some or all of the other meetings (or disabling or muting the audio feed(s) of some or all of the other meetings)).

In some embodiments, the intelligent meeting assistant system 206 may perform the monitoring and/or provide a notification for a first meeting if (e.g., only if) at least a second meeting is being simultaneously facilitated, and in certain embodiments, if (e.g., only if) the intelligent meeting assistant system 206 determines that a user is focusing on, or engaged in, that second meeting and not focusing on, or engaged in, the first meeting. This can avoid the intelligent meeting assistant system 206 from providing unneeded notifications for the first meeting in a case where the user is already engaged in the first meeting. The intelligent meeting assistant system 206 may determine whether a user is (e.g., likely) engaged in the second meeting in a variety of ways, including, for example, based on user input (e.g., based on user selection of one or more items associated with a meeting interface corresponding to the second meeting), based on the meeting interface corresponding to the second meeting being presented more prominently (e.g., over or above) a meeting interface corresponding to the first meeting or other meetings, based on an audio output volume of the second meeting being higher than an audio output volume of the first meeting or other meetings, based on an audio feed of the second meeting being enabled and an audio feed of the first meeting or other meetings being disabled, and/or the like.

In this way, the intelligent meeting assistant system 206 can notify the user that something of interest has occurred in a particular meeting, which can allow the user to focus the user's attention on that meeting or otherwise determine whether the user's attention is actually needed.

In various embodiments, the intelligent meeting assistant system 206 may, as part of monitoring a meeting (e.g., as described above with respect to reference number 230), record the meeting (e.g., audio of the meeting, video of the meeting, etc.) in a storage device and, based on a detection of an occurrence of a trigger phrase or condition in the meeting, provide an option to the user to review a portion of the recorded meeting associated with the occurrence. In some embodiments, the intelligent meeting assistant system 206 may provide an option to the user to listen to an audio portion of the recorded meeting beginning from a point that is a certain amount of time prior to the detected occurrence of the trigger phrase or condition (e.g., from a point that is ten seconds prior to the detected occurrence of the trigger phrase or condition, from a point that is thirty seconds prior to the detected occurrence of the trigger phrase or condition, and/or the like). In some embodiments, the intelligent meeting assistant system 206 may additionally, or alternatively, transcribe the audio portion of the recorded meeting (e.g., the last minute of the recorded meeting, the last twenty seconds of the recorded meeting, the last fifteen seconds of the recorded meeting, and/or the like), and provide an option to the user to review the transcription. Providing a portion of the recorded meeting for user review can be helpful to the user, particularly if the user was previously focusing on a different meeting, or was preoccupied with a different task, and was unable to engage in the present meeting until the notification was provided. This can also provide the user with some context, which can aid the user in determining what was discussed and whether the user's attention is actually warranted.

In various embodiments, the intelligent meeting assistant system 206 can be configured to allow a user to customize (e.g., via toggle switches, custom user inputs, and/or the like) the functionality of the intelligent meeting assistant system 206. In some embodiments, the intelligent meeting assistant system 206 can provide one or more options for enabling and disabling (e.g., turning on or turning off) some or all of the functionalities of the intelligent meeting assistant system 206.

In various embodiments, the intelligent meeting assistant system 206 may enable a user to customize the notifications, such as how the notifications are to be presented—e.g., visually (via a pop-up alert, by causing an icon or a window to blink (e.g., a certain number of times, in a certain pattern, etc.), light up, or change color (e.g., from one color to another color), etc.), audibly (by outputting a certain tone, a certain tune, a spoken phrase, etc.), haptically (by causing a device to vibrate for a certain duration, in a certain pattern, etc.), and/or the like. In various embodiments, the intelligent meeting assistant system 206 may enable a user to select different types of notifications for different trigger phrases or conditions (e.g., a visual alert, such as by blinking an icon, if a first trigger phrase is detected; an audible alert, such as by outputting a certain tone, if a second trigger condition is detected; etc.).

In various embodiments, the intelligent meeting assistant system 206 may enable a user to customize the adjustments that are made to the manners of presentation of meetings when an occurrence of a trigger phrase/condition is detected in one of the meetings (e.g., the adjustments described above with respect to reference number 240). For example, for a case where an occurrence of a trigger phrase or condition is detected in a first meeting, the user may define whether to adjust a manner of presentation of the first meeting and/or the manners of presentation of some or all of other meetings, and the types of adjustments to be made—e.g., increasing a display brightness for the first meeting by a certain level; dimming the display brightness for some or all of the other meetings by a certain level; increasing an audio output volume of the audio feed of the first meeting by a certain level; decreasing audio output volume(s) of the audio feed(s) of some or all of the other meetings by a certain level; and/or the like.

In various embodiments, the intelligent meeting assistant system 206 may enable a user to customize whether and/or how recordings of meetings (e.g., described above with respect to reference number 240) are made or presented. For example, a user may define whether audio of a meeting is to be recorded, whether video of the meeting is to be recorded, whether a transcript of the recording should be prepared, how far back to playback a recording after a trigger phrase or condition is detected (e.g., thirty seconds prior to the detected occurrence, one minute prior to the detected occurrence, etc.), and/or the like.

As described above, the intelligent meeting assistant system 206 may enable a user to define not only trigger phrases (e.g., words) to be monitored for in a meeting, but also trigger conditions. Some examples of trigger conditions include a particular meeting participant speaking or interacting in the meeting, a live camera feed of a particular meeting participant being presented, a certain meeting presentation slide being presented, a particular image being displayed, a particular video being presented, a certain audio clip being outputted, and/or the like. Other types of trigger conditions are possible, such as those relating to a quantity of occurrences of trigger phrases, time constraints relating to occurrences of trigger phrases, occurrences of trigger phrases defined for other meetings, priority levels associated with trigger phrases, etc.

As an example, a user may define that a notification should be provided if (e.g., only if) two or more occurrences of the same trigger phrase or condition are detected. As another example, a user may define that a notification should be provided if (e.g., only if) occurrences of two or more different trigger phrases are detected within a threshold time from one another, within the same (e.g., spoken) sentence, within a threshold number of words from one another, and/or the like. For instance, the user may specify that the user would like to be alerted to the user's name being spoken or displayed within a threshold time from a project title being spoken or displayed, or the user's name and the project title being spoken within a threshold number of words from one another. This can prevent the intelligent meeting assistant system 206 from unnecessarily notifying the user of trigger phrase/condition detection(s) where a particular trigger word occurs out of a relevant context.

As a further example, a user may define that a notification should be provided for a first meeting if (e.g., only if) a notification for a second meeting has not occurred (e.g., has not occurred at all, has not occurred within a threshold period of time, such as in the past ten minutes, fifteen minutes, etc.). As some other examples, a user may define that a notification should be provided if (e.g., only if) an occurrence of a first trigger phrase or condition is detected after an occurrence of a second trigger phrase or condition has already been detected (e.g., for the same meeting); if (e.g., only if) an occurrence of a trigger phrase or condition is detected during a certain portion of the meeting (e.g., during the first ten minutes of the meeting, the first half hour of the meeting, etc.); if (e.g., only if) an occurrence of a trigger phrase is detected while a certain image, video, or presentation slide is being presented, after a certain image, video, or presentation slide has already been displayed and is no longer being displayed, and/or the like; if (e.g., only if) an occurrence of a trigger phrase is detected to be uttered by a particular participant (e.g., by a participant associated with a certain identifier, such as a certain name, a certain screen-name, or the like); if (e.g., only if) multiple occurrences of a trigger phrase are detected to be uttered by the same participant or by different participants of the meeting; and/or the like.

As yet another example, a user may associate a first priority level with a first trigger phrase or condition for a first meeting, and associate a second, lower priority level with a second trigger phrase or condition for a second meeting, where the intelligent meeting assistant system 206 may provide notifications, relating to detected occurrences of the first and second trigger phrases, differently based on the priority levels. Continuing the example, in a case where an occurrence of the first trigger phrase or condition is detected and an occurrence of the second trigger phrase or condition is also detected within a threshold time of the occurrence of the first trigger phrase, the intelligent meeting assistant system 206 may provide a notification for the first meeting and not the second meeting, or may provide notifications for both the first meeting and the second meeting, but where the notification for the second meeting is less prominent than the notification for the first meeting (e.g., a notification in the form of an audible alert as well as a blinking icon for the first meeting and only a notification in the form of a slight change in color of a title bar for the second meeting, and/or the like).

In various embodiments, the intelligent meeting assistant system 206 may enable a user to associate or link (e.g., via a short range communications protocol, such as Bluetooth, Near-Field Communication (NFC), and/or the like) a wearable device (e.g., a smart watch, a pair of smart glasses, and/or the like) with the user device 202 and/or the meeting platform 204. In various embodiments, the intelligent meeting assistant system 206 may be capable of providing notification(s) to the wearable device and/or facilitating the meeting via the wearable device (e.g., such that, in a case where an occurrence of a trigger phrase or condition is detected in the meeting, the user may re-engage in the meeting even if the user is located away from the user device 202). In certain embodiments, the intelligent meeting assistant system 206 may enable a user to define whether, when, and/or how notifications are to be provided depending on a detected presence of the wearable device within a vicinity of the user device 202. For example, in a case where a user expects that the user may move away from the user device 202 during a meeting, and would be able to quickly return and re-engage in the meeting only if the user remains within a threshold distance from the user device 202, the user may define that a notification (in response to detecting an occurrence of a trigger phrase or condition in the meeting) should be provided if (e.g., only if) the wearable device is determined to be within the vicinity of (e.g., within the threshold distance from) the user device 202. As another example, a user may alternatively define that the notification should be provided if (e.g., only if) the wearable device is determined not to be within the vicinity of (e.g., is determined to be beyond a threshold distance from) the user device 202.

It should be appreciated and understood that the intelligent meeting assistant system 206 may enable a user to define numerous combinations of trigger phrases and/or trigger conditions, and that the foregoing possibilities are provided only as examples.

In various embodiments, the intelligent meeting assistant system 206 can employ machine learning algorithm(s) that are configured to learn a user's behavior or preferences relating to meetings. This can include, for example, the user's preferred customizations relating to trigger phrases/conditions and/or notifications (e.g., priority levels that the user tends to associate with certain trigger phrases; trigger phrases that the user tends to input for each meeting that the user attends, such as the user's name; etc.), the user's behavior upon joining and/or while engaged in a meeting (e.g., user adjustments to audio output volume depending on subject matter being discussed in a meeting, maximizing of or minimizing of a meeting interface, etc.), the user's behavior in response to notifications provided by the intelligent meeting assistant system 206, and/or the like, or other information relating to trigger phrases/conditions (e.g., synonyms of trigger phrases, certain trigger phrases that are too generic and often result in false triggers (where a user might re-engage in a meeting and quickly disengage therefrom), and/or the like). In various embodiments, the intelligent meeting assistant system 206 may adjust, based on the learned information, future actions performed by, or outputs provided by, the intelligent meeting assistant system 206 to enhance the user's meeting experiences. For example, in some embodiments, the intelligent meeting assistant system 206 may provide information regarding a user's preferences or behavior as input to one or more machine learning algorithms, which may perform machine learning to automate future determinations or predictions of user preferences or behavior. For instance, the intelligent meeting assistant system 206 may train a machine learning algorithm based on known inputs (e.g., detections of occurrences of trigger phrases or conditions, notifications provided based upon such detections, and/or the like) and known outputs (e.g., the user choosing to engage in a first meeting, and not a second meeting, even though an occurrence of a trigger phrase or condition is detected in both the first meeting and the second meeting; the user choosing to engage in a meeting upon detection of an occurrence of one trigger phrase or condition for the meeting and not upon detection of an occurrence of a second trigger phrase or condition for the same meeting; the user choosing (e.g., always choosing) to engage in a meeting that a certain other participant (e.g., the user's supervisor, as identified by a certain name, a certain screenname, or the like) is also participating in (e.g., despite an occurrence of a low priority trigger being detected or even no occurrence of any trigger phrase or condition being detected); the user choosing to engage in a meeting each time there is a detection of an occurrence of the user's name; the user choosing to engage in one meeting upon reviewing a recording of the meeting and not engaging in another meeting upon reviewing a recording of that other meeting; and/or the like). In some embodiments, the intelligent meeting assistant system 206 may refine a machine learning algorithm based on feedback received from a user of the intelligent meeting assistant system 206 and/or from one or more other devices (e.g., management device(s)). For example, the user of the intelligent meeting assistant system 206 and/or one or more management devices may provide feedback indicating whether predictions of user preferences or behavior, made by the machine learning algorithm based on new inputs, are accurate and/or helpful. When the feedback indicates that a particular prediction is accurate and/or helpful, the intelligent meeting assistant system 206 may configure the machine learning algorithm to make predictions of user preferences or behavior based on the particular prediction (e.g., to predict user preferences or behavior in a manner similar to that in which the particular prediction was made). When the feedback indicates that a particular prediction is not accurate or helpful, the intelligent meeting assistant system 206 may configure the machine learning algorithm to avoid predicting user preferences or behavior in a manner in which the particular prediction was made. In this way, the intelligent meeting assistant system 206 can predict user preferences or behavior based on one or more machine learning algorithms, which improves the accuracy of the predictions, and conserves processor and/or storage resources that may otherwise be used to generate and store rules for predicting user preferences or behavior.

It is to be understood and appreciated that, although FIG. 2A has been described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2B:
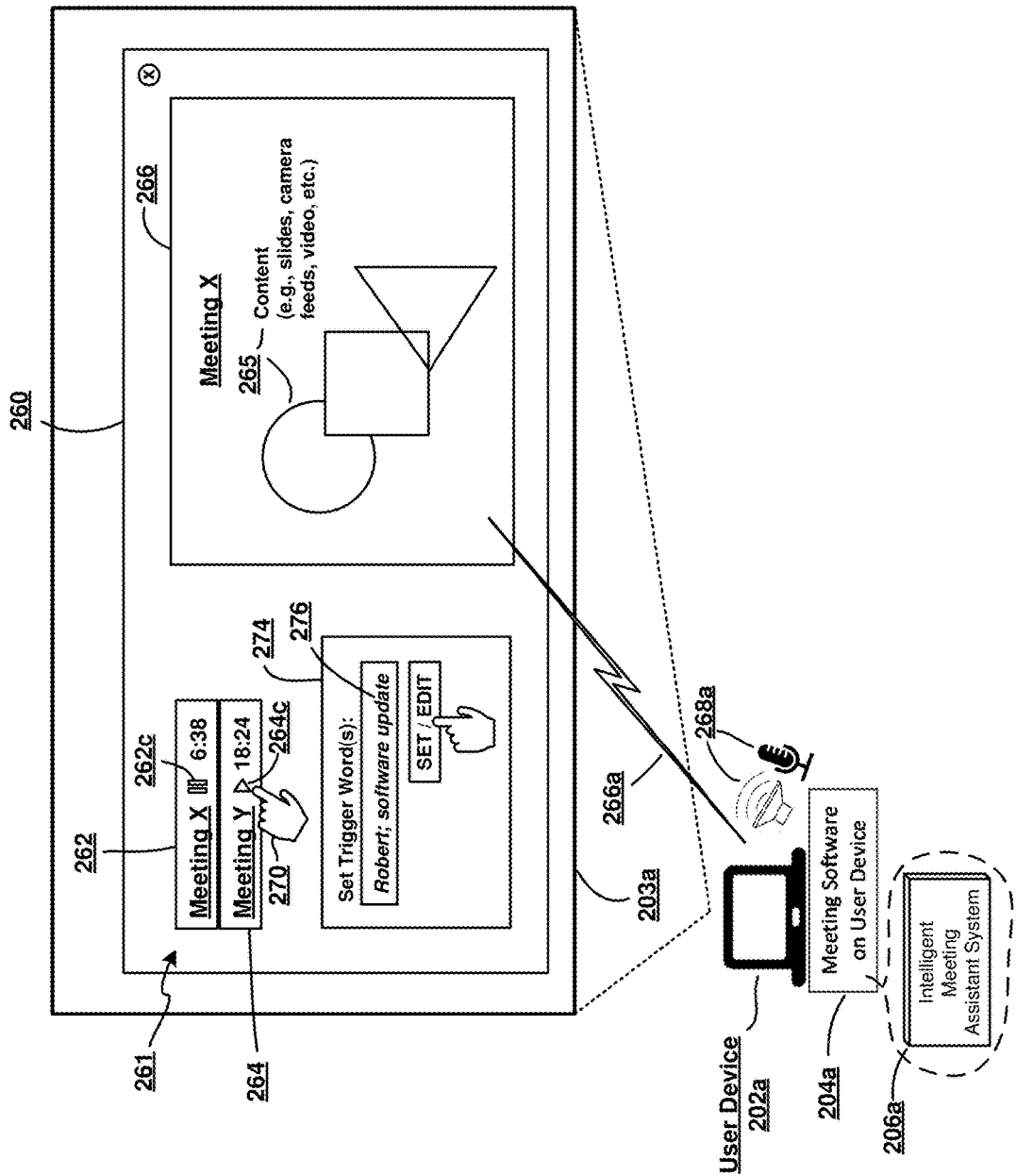
FIG. 2B is a block diagram illustrating an example, non-limiting embodiment of a system functioning in, or in conjunction with, the communications network of FIG. 1 and/or the system of FIG. 2A in accordance with various aspects described herein.

FIG. 2B is a block diagram illustrating an example, non-limiting embodiment of a system 250 functioning within, or operatively overlaid upon, the communications network of FIG. 1 in accordance with various aspects described herein. The system 250 may be similar to the system 200 of FIG. 2A. For example, the system 250 may include a user device 202a having a meeting platform 204a that includes, or that is integrated with, an intelligent meeting assistant system 206a that may be similar to the intelligent meeting assistant system 206 of FIG. 2A. As shown in FIG. 2B, the meeting platform 204a may provide a different manner of presenting and/or facilitating multiple meetings than that described above with respect to the meeting platform 204 of FIG. 2A. For example, the meeting platform 204a may present an interface 260, on a display 203a of the user device 202a, having a meeting selection area 261 that includes respective graphical components for each meeting that is being facilitated by the meeting platform 204a—e.g., as shown by reference number 262 for a meeting X and reference number 264 for a meeting Y. As shown in FIG. 2B, the meeting selection area 261 can include one or more control selectors 262c and 264c (e.g., a play button, a pause button, and/or the like) for each facilitated meeting. Selections of the control selectors 262c and/or 264c can control whether content of the meeting X or content of the meeting Y is presented to an interaction area 266 of the interface 260, and/or whether audio exchanges of the meeting X or audio exchanges for the meeting Y are facilitated (e.g., via connection 266a to audio input/output components 268a of the user device 202a). For example, as shown in FIG. 2B, the control selector 262c is currently occupying a play mode, where content 265 of the meeting X is being presented in the interaction area 266 and audio exchanges for the meeting X are facilitated via the connection 266a to audio input/output components 268a of the user device 202a. In a case where a user selects the control selector 264c (e.g., as shown by reference numeral 270) to play the meeting Y, or selects the control selector 262c to pause the meeting X, the meeting platform 204 may cause the content of the meeting Y to be presented in the interaction area 266 and audio exchanges for the meeting Y to be facilitated via the connection 266a to the audio input/output components 268a of the user device 202a. A paused meeting may still be ongoing, and the meeting platform 204a may still be receiving communications relating to the meeting, but content of the meeting may not be presented in the interaction area 266 and/or audio exchanges for the meeting may not be facilitated.

As shown in FIG. 2B, the intelligent meeting assistant system 206a can provide a trigger interface 274 that may be similar to the trigger interface 224 described above with respect to FIG. 2A. For example, the trigger interface 274 may enable a user to define trigger phrase(s), such as a trigger phrase 276, and/or trigger condition(s) to monitor for in a meeting.

In some embodiments, and by virtue of the manner in which meetings are presented and/or facilitated in the interface 260 (e.g., where only one meeting's content and audio exchanges are presented and/or facilitated at a time), the intelligent meeting assistant system 206a can be configured (e.g., by default, based on user preferences, and/or the like) to automatically switch from presenting and facilitating audio exchanges for a first meeting to presenting and facilitating audio exchanges for a second meeting, based upon detection of an occurrence of a trigger phrase or condition in the second meeting. For example, assuming that the user set the trigger phrase "software update" for the meeting Y, in a case where the intelligent meeting assistant system 206a monitors the meeting Y and detects an occurrence of the trigger phrase "software update" based on the monitoring, the intelligent meeting assistant system 206a can automatically "pause" the meeting X and "play" the meeting Y, such that content of the meeting Y is presented in the interaction area 266 and audio exchanges for the meeting Y are facilitated via the connection 266a. In various implementations, the intelligent meeting assistant system 206a may additionally, or alternatively, provide notification(s) to the user regarding the detection of the occurrence of the trigger phrase or condition, similar to the notification(s) described above with respect to FIG. 2A.

It is to be understood and appreciated that, although the system 250 may have been described as being distinct from the system 200, some or all of the aspects and/or functionalities of the system 200 may apply to, be included in, or be provided by the system 250. For example, some or all of the aspects and/or functionalities of the meeting platform 204, described above with respect to FIG. 2A, may apply to, be included in, or be provided by the meeting platform 204a, and some or all of the aspects and/or functionalities of the intelligent meeting assistant system 206 described above with respect to FIG. 2A may apply to, be included in, or be provided by the intelligent meeting assistant system 206a.

It is also to be understood and appreciated that the quantity and arrangement of devices, systems, interfaces, and components shown in FIGS. 2A and 2B are provided as examples. In practice, there may be additional devices, systems, interfaces, and/or components, fewer devices, systems, interfaces, and/or components, or differently arranged devices, systems, interfaces, and/or components than those shown in FIGS. 2A and 2B. For example, each of the system 200 and the system 250 can include more or fewer devices, systems, interfaces, and/or components, etc. Furthermore, two or more devices, systems, interfaces, or components shown in one or more of FIGS. 2A and 2B may be implemented within a single device, system, interface, and/or component, or a single device, system, interface, or component shown in one or more of FIGS. 2A and 2B may be implemented as multiple, distributed devices, systems, interfaces, or components. Additionally, or alternatively, a set of devices, systems, interfaces, or components (e.g., one or more devices, systems, interfaces, or components) of the system 200 or of the system 250 may perform one or more functions described as being performed by another set of devices, systems, interfaces, or components of the system 200 or of the system 250.

Figure 2C:
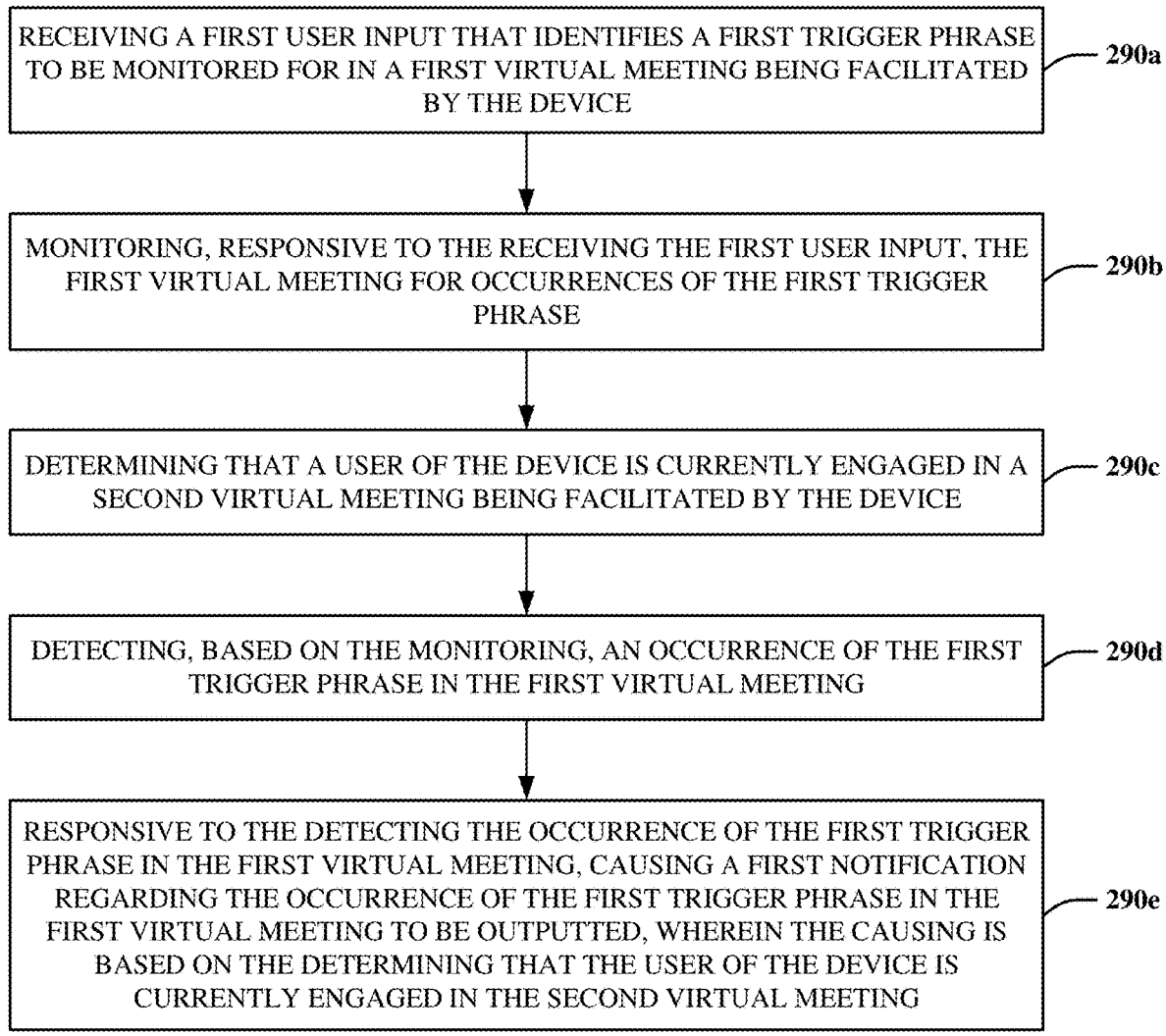
FIG. 2C depicts an illustrative embodiment of a method in accordance with various aspects described herein.

FIG. 2C depicts an illustrative embodiment of a method 290 in accordance with various aspects described herein.

In some embodiments, one or more process blocks of FIG. 2C can be performed by an intelligent meeting assistant system, such as the intelligent meeting assistant system 206 or 206a. In some embodiments, one or more process blocks of FIG. 2C may be performed by another device or a group of devices separate from or including the intelligent meeting assistant system, such as the meeting platform 204 or 204a, the user device 202 or 202a, and/or the user device 208.

At 290a, the method can include receiving a first user input that identifies a first trigger phrase to be monitored for in a first virtual meeting being facilitated by the device. For example, the intelligent meeting assistant system 206 or 206a can receive a first user input that identifies a first trigger phrase to be monitored for in a first virtual meeting being facilitated by the device in a manner similar to that described above with respect to the system 200 of FIG. 2A and/or the system 250 of FIG. 2B.

At 290b, the method can include monitoring, responsive to the receiving the first user input, the first virtual meeting for occurrences of the first trigger phrase. For example, the intelligent meeting assistant system 206 or 206a can monitor, responsive to the receiving the first user input, the first virtual meeting for occurrences of the first trigger phrase in a manner similar to that described above with respect to the system 200 of FIG. 2A and/or the system 250 of FIG. 2B.

At 290c, the method can include determining that a user of the device is currently engaged in a second virtual meeting being facilitated by the device. For example, the intelligent meeting assistant system 206 or 206a can determine that a user of the device is currently engaged in a second virtual meeting being facilitated by the device in a manner similar to that described above with respect to the system 200 of FIG. 2A and/or the system 250 of FIG. 2B.

At 290d, the method can include detecting, based on the monitoring, an occurrence of the first trigger phrase in the first virtual meeting. For example, the intelligent meeting assistant system 206 or 206a can detect, based on the monitoring, an occurrence of the first trigger phrase in the first virtual meeting in a manner similar to that described above with respect to the system 200 of FIG. 2A and/or the system 250 of FIG. 2B.

At 290e, the method can include, responsive to the detecting the occurrence of the first trigger phrase in the first virtual meeting, causing a first notification regarding the occurrence of the first trigger phrase in the first virtual meeting to be outputted, wherein the causing is based on the determining that the user of the device is currently engaged in the second virtual meeting. For example, the intelligent meeting assistant system 206 or 206a can, responsive to the detecting the occurrence of the first trigger phrase in the first virtual meeting, cause a first notification regarding the occurrence of the first trigger phrase in the first virtual meeting to be outputted in a manner similar to that described above with respect to the system 200 of FIG. 2A and/or the system 250 of FIG. 2B, where the causing is based on the determining that the user of the device is currently engaged in the second virtual meeting.

In various embodiments, the monitoring the first virtual meeting may include performing speech-to-text conversion processing or natural language processing on audio signals associated with the first virtual meeting. In some embodiments, the determining that the user is currently engaged in the second virtual meeting may include determining that a meeting interface associated with the second virtual meeting is presently being displayed, that an audio output volume corresponding to the second virtual meeting exceeds a threshold, or a combination thereof. In certain embodiments, the notification may include a visual alert, an audible alert, a haptic alert, or a combination thereof. In one or more embodiments, the causing the notification to be outputted may be in accordance with an AI model that is trained based on historical behavior of the user in response to prior notifications of detected occurrences of trigger phrases for prior virtual meetings. In some embodiments, the causing the notification to be outputted may not be performed if the user of the device is determined not to be currently engaged in the second virtual meeting.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, the subsystems and functions of system 250, and method 290 presented in FIGS. 1, 2A, 2B, and 2C. For example, virtualized communications network 300 can facilitate, in whole or in part, receiving of user inputs or selections identifying one or more trigger phrases and/or conditions to monitor for in a virtual meeting, monitoring of the virtual meeting for occurrences of the one or more trigger phrases/conditions, and providing of user notification(s) based upon detecting an occurrence of the one or more trigger phrases/conditions in the virtual meeting.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
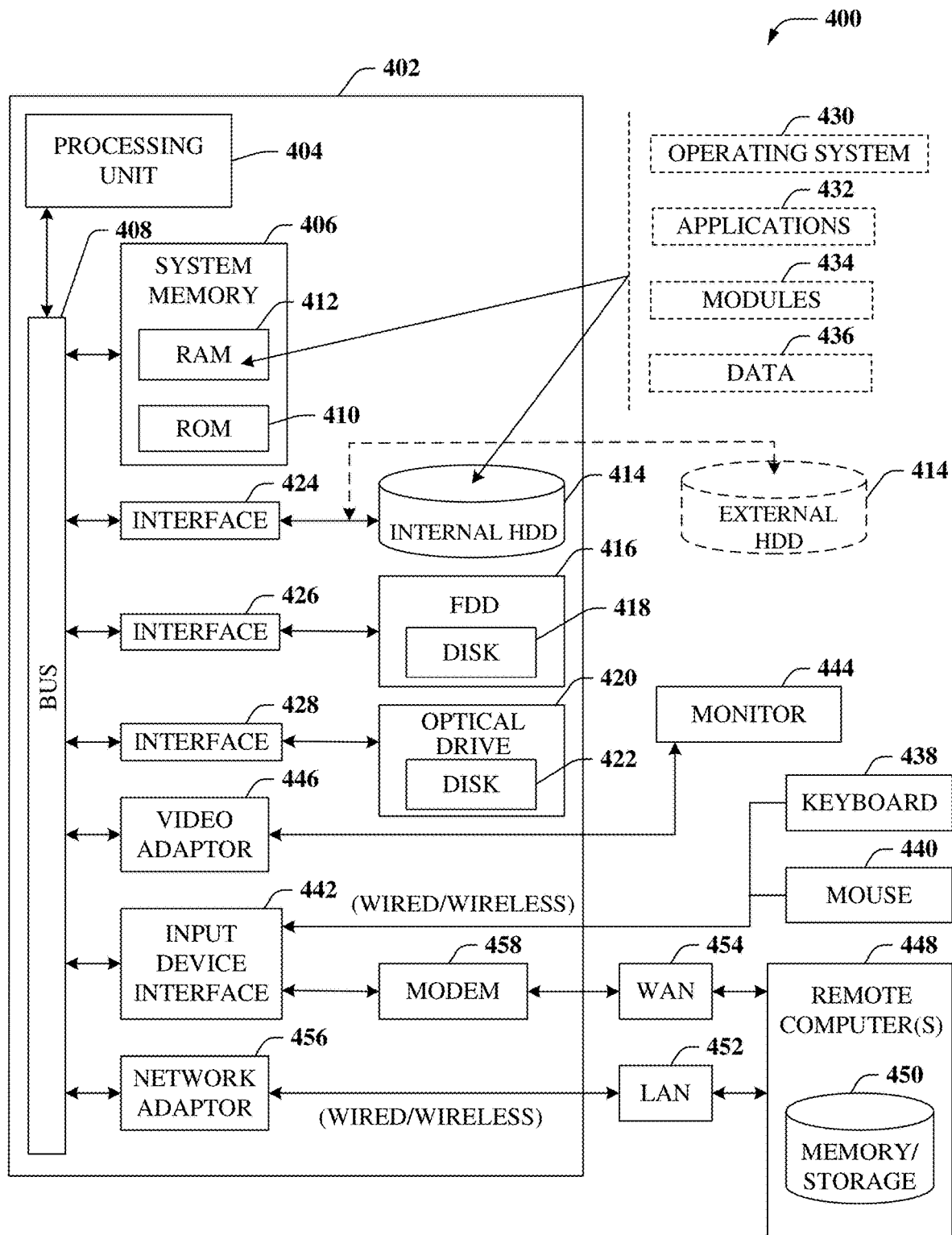
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, receiving of user inputs or selections identifying one or more trigger phrases and/or conditions to monitor for in a virtual meeting, monitoring of the virtual meeting for occurrences of the one or more trigger phrases/conditions, and providing of user notification(s) based upon detecting an occurrence of the one or more trigger phrases/conditions in the virtual meeting.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
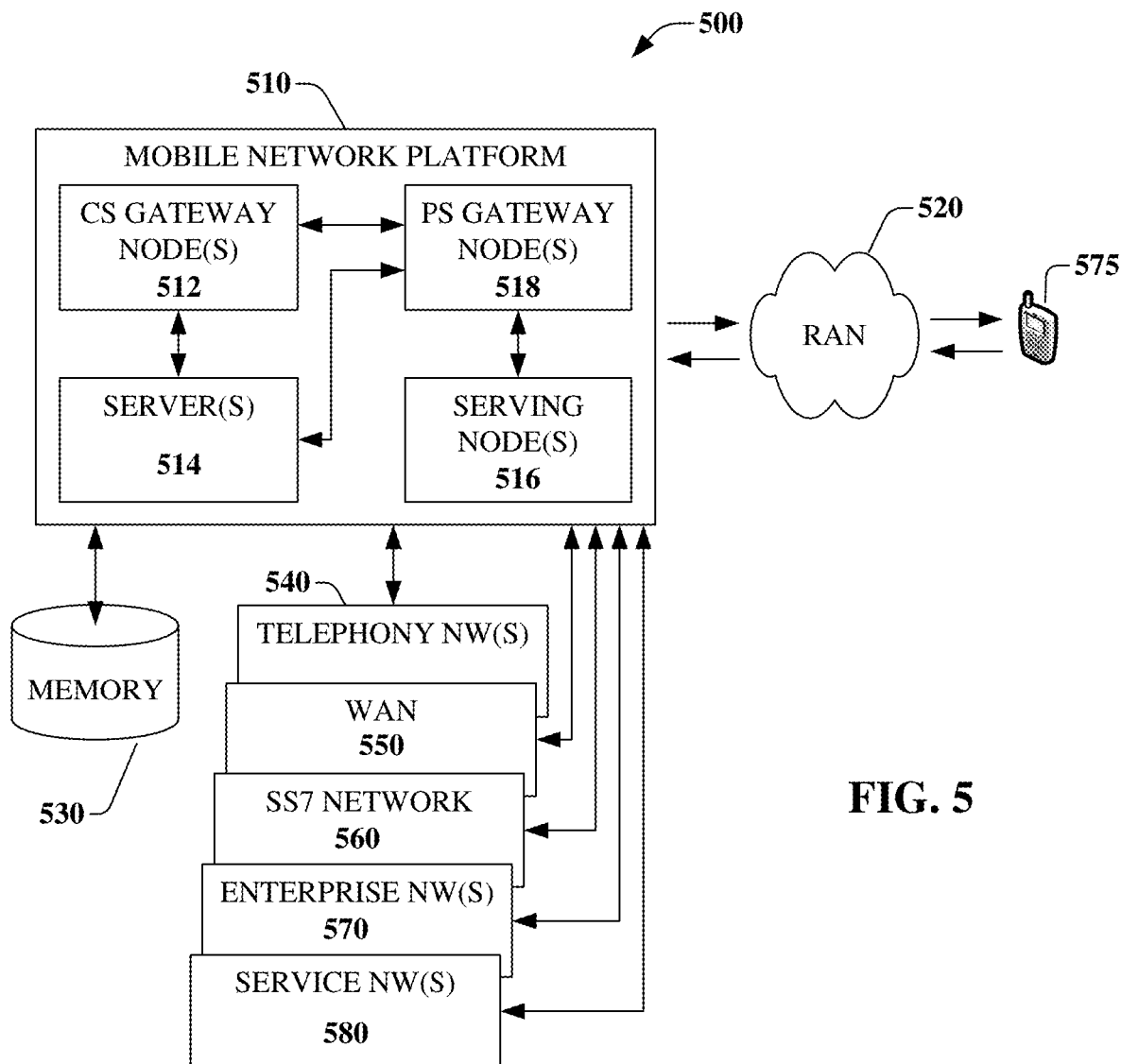
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, receiving of user inputs or selections identifying one or more trigger phrases and/or conditions to monitor for in a virtual meeting, monitoring of the virtual meeting for occurrences of the one or more trigger phrases/conditions, and providing of user notification(s) based upon detecting an occurrence of the one or more trigger phrases/conditions in the virtual meeting. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated with mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
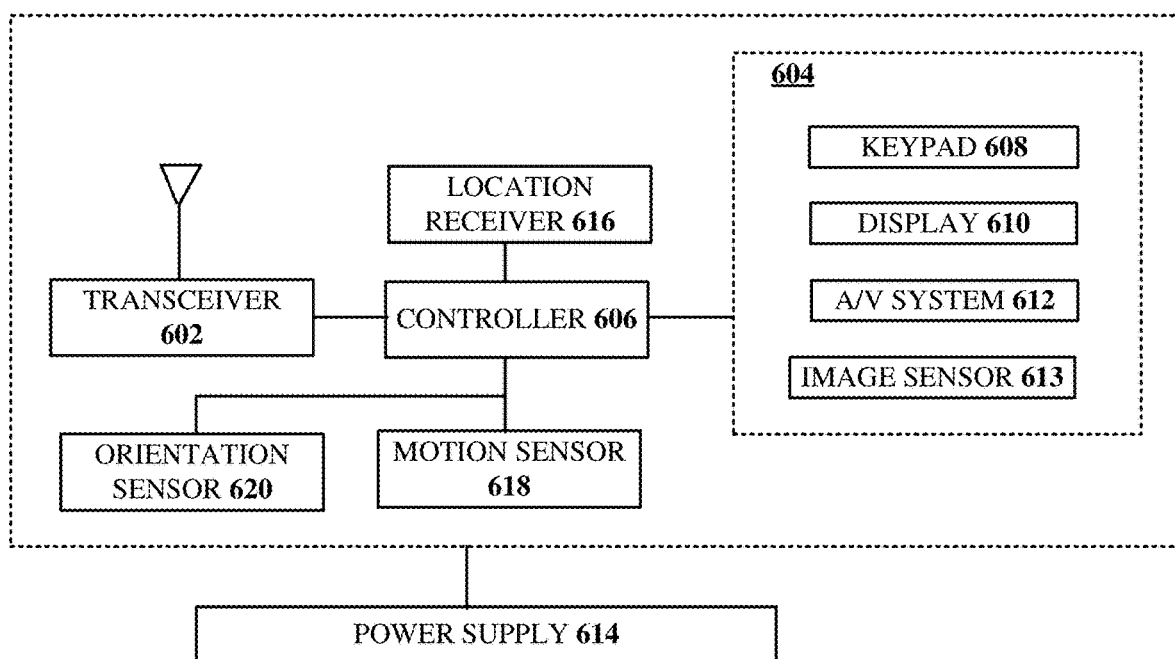
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, receiving of user inputs or selections identifying one or more trigger phrases and/or conditions to monitor for in a virtual meeting, monitoring of the virtual meeting for occurrences of the one or more trigger phrases/conditions, and providing of user notification(s) based upon detecting an occurrence of the one or more trigger phrases/conditions in the virtual meeting.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a first user input that identifies a first trigger phrase to be monitored for in a first virtual meeting being facilitated by the device over a network;
monitoring, responsive to the receiving the first user input, the first virtual meeting for occurrences of the first trigger phrase;
determining that a user of the device is currently engaged in a second virtual meeting being facilitated by the device over the network;
detecting, based on the monitoring, an occurrence of the first trigger phrase in the first virtual meeting; and responsive to the detecting the occurrence of the first trigger phrase in the first virtual meeting, providing a first notification regarding the occurrence of the first trigger phrase in the first virtual meeting, wherein the providing the first notification is based on the determining that the user of the device is currently engaged in the second virtual meeting, wherein the providing the first notification comprises adjusting manners of presentation of the first virtual meeting and the second virtual meeting, and wherein the manners of presentation comprise a first manner of presentation in which a first display brightness of a first interface for the first virtual meeting is increased, and a second manner of presentation in which a second display brightness of a second interface for the second virtual meeting is decreased.

2. The device of claim 1, wherein the providing the first notification is in accordance with an artificial intelligence (AI) model, wherein the AI model is trained based on historical behavior of the user in response to prior notifications of detected occurrences of trigger phrases for prior virtual meetings, wherein a wearable device is associated with the processing system, wherein providing of notifications is performed depending on a determined distance between the wearable device and the processing system, and wherein the providing the first notification is performed only if the wearable device is determined to be within a threshold distance from the processing system.

3. The device of claim 1, wherein the first trigger phrase comprises one or more words, one or more numbers, or a combination thereof.

4. The device of claim 1, wherein the monitoring the first virtual meeting comprises performing speech-to-text conversion processing or natural language processing on audio signals associated with the first virtual meeting.

5. The device of claim 1, wherein the determining that the user is currently engaged in the second virtual meeting comprises determining that the second interface associated with the second virtual meeting is presently being displayed, determining that an audio output volume corresponding to the second virtual meeting exceeds a threshold, or a combination thereof.

6. The device of claim 1, wherein the first notification further comprises a visual alert, an audible alert, a haptic alert, or a combination thereof.

7. The device of claim 1, wherein the providing the first notification is not performed if the user of the device is determined not to be currently engaged in the second virtual meeting.

8. The device of claim 1, wherein the operations further comprise providing a user interface that enables the user to input trigger phrases, and wherein the receiving the first user input comprises receiving the first user input via the user interface.

9. The device of claim 1, wherein the operations are performed by a meeting platform that facilitates the first virtual meeting and the second virtual meeting.

10. The device of claim 1, wherein the operations further comprise, based on the determining that the user of the device is currently engaged in the second virtual meeting, and responsive to the detecting the occurrence of the first trigger phrase in the first virtual meeting, decreasing an audio output volume of the second virtual meeting and increasing an audio output volume of the first virtual meeting.

11. The device of claim 1, wherein the operations further comprise:

receiving a second user input that identifies a second trigger phrase to be monitored for in the second virtual meeting;
monitoring, responsive to the receiving the second user input, the second virtual meeting for occurrences of the second trigger phrase;
determining that the user of the device is currently engaged in the first virtual meeting;
detecting, based on the monitoring the second virtual meeting, an occurrence of the second trigger phrase in the second virtual meeting; and
responsive to the detecting the occurrence of the second trigger phrase in the second virtual meeting, providing a second notification regarding the occurrence of the second trigger phrase in the second virtual meeting, wherein the providing the second notification is based on the determining that the user of the device is currently engaged in the first virtual meeting, and wherein the providing the second notification comprises readjusting the manners of presentation of the first virtual meeting and the second virtual meeting such that the first display brightness of the first interface for the first virtual meeting is decreased and the second display brightness of the second interface for the second virtual meeting is increased.

12. A non-transitory machine-readable medium, comprising executable instructions that, when executed by a processing system including a processor, facilitate performance of operations, the operations comprising:

obtaining a user input that identifies a trigger phrase to be monitored for in a first virtual meeting being facilitated over a network;
monitoring, responsive to the obtaining the user input, the first virtual meeting for occurrences of the trigger phrase;
determining that a user is currently engaged in a second virtual meeting that is being facilitated over the network while the first virtual meeting is being facilitated;
detecting, based on the monitoring, an occurrence of the trigger phrase in the first virtual meeting; and
responsive to the detecting the occurrence of the trigger phrase in the first virtual meeting, causing a first presentation of the first virtual meeting and a second presentation of the second virtual meeting to become adjusted to enable the user to transition from engaging in the second virtual meeting to engaging in the first virtual meeting, wherein the causing the first presentation of the first virtual meeting and the second presentation of the second virtual meeting to become adjusted is based on the determining that the user is currently engaged in the second virtual meeting, and wherein the causing the first presentation of the first virtual meeting and the second presentation of the second virtual meeting to become adjusted comprises performing a first adjustment to the first presentation to increase a first display brightness of a first interface for the first virtual meeting and a second adjustment to the second presentation to decrease a second display brightness of a second interface for the second virtual meeting.

13. The non-transitory machine-readable medium of claim 12, wherein the monitoring the first virtual meeting comprises analyzing a data stream associated with the first virtual meeting.

14. The non-transitory machine-readable medium of claim 12, wherein the monitoring the first virtual meeting comprises storing a recording of a data stream associated with the first virtual meeting, and generating a transcript based on the recording, and wherein the operations further comprise presenting a portion of the transcript that corresponds to a portion of the recording which precedes the occurrence of the trigger phrase.

15. The non-transitory machine-readable medium of claim 12, wherein the determining that the user is currently engaged in the second virtual meeting comprises determining that the second interface associated with the second virtual meeting is currently being presented on a device.

16. The non-transitory machine-readable medium of claim 12, wherein the causing the first presentation of the first virtual meeting and the second presentation of the second virtual meeting to become adjusted further comprises enabling an audio feed associated with the first virtual meeting and disabling an audio feed associated with the second virtual meeting, wherein a wearable device is associated with the processing system, wherein adjustments to presentations of virtual meetings are performed depending on a determined distance between the wearable device and the processing system, and wherein the first adjustment to the first presentation and the second adjustment to the second presentation are performed only if the wearable device is determined to be within a threshold distance from the processing system.

17. A method, comprising:
   obtaining, by a processing system including a processor, a user input that defines a trigger condition to be monitored for in a first meeting facilitated over a network;
   monitoring, by the processing system and responsive to the obtaining the user input, the first meeting for occurrences of the trigger condition;
   determining, by the processing system, that a user is currently engaged in a second meeting facilitated over the network and not engaged in the first meeting;
   identifying, by the processing system and based on the monitoring, an occurrence of the trigger condition in the first meeting, resulting in an identified occurrence of the trigger condition; and
   responsive to the identifying the occurrence of the trigger condition in the first meeting, providing, by the processing system, a notification to the user regarding detection of the trigger condition in the first meeting to enable the user to engage in the first meeting, wherein the providing the notification is based on the determining that the user is currently engaged in the second meeting and not engaged in the first meeting, wherein the providing the notification comprises adjusting manners of presentation of the first meeting and the second meeting, and wherein the manners of presentation comprise a first manner of presentation in which a first display brightness of a first interface for the first meeting is increased, and a second manner of presentation in which a second display brightness of a second interface for the second meeting is decreased.

18. The method of claim 17, wherein the trigger condition comprises a particular meeting participant speaking or interacting in the first meeting, a live camera feed of the particular meeting participant being presented in the first meeting, a certain meeting presentation slide being presented in the first meeting, a particular image being displayed in the first meeting, a particular video being presented in the first meeting, a certain audio clip being outputted in the first meeting, or a combination thereof.

19. The method of claim 17, wherein the monitoring the first meeting comprises storing a recording of a data stream associated with the first meeting, and wherein the providing the notification comprises outputting a portion of the recording that precedes the identified occurrence of the trigger condition.

20. The method of claim 17, wherein the determining that the user is currently engaged in the second meeting and not engaged in the first meeting comprises determining that a first audio output volume associated with the first meeting is lower than a second audio output volume associated with the second meeting.

* * * * *